(12) United States Patent
Kadam et al.

(10) Patent No.: US 11,152,863 B2
(45) Date of Patent: Oct. 19, 2021

(54) METHOD FOR CONTROLLING EXTRACTION OF POWER FROM MULTIPLE PHOTO VOLTAIC (PV) ARRAYS AND SYSTEM THEREOF

(71) Applicant: Indian Institute of Technology Bombay, Maharashtra (IN)

(72) Inventors: Abhijit Kadam, Maharashtra (IN); Anshuman Shukla, Maharashtra (IN)

(73) Assignee: INDIAN INSTITUTE OF TECHNOLOGY BOMBAY, Mumbai (IN)

(*) Notice: Subject to any disclaimer, the term of this patent is extended or adjusted under 35 U.S.C. 154(b) by 93 days.

(21) Appl. No.: 16/515,008

(22) Filed: Jul. 17, 2019

(65) Prior Publication Data
US 2020/0028440 A1 Jan. 23, 2020

(30) Foreign Application Priority Data

Jul. 18, 2018 (IN) .............................. 201821026838

(51) Int. Cl.
*H02M 3/335* (2006.01)
*H02M 3/28* (2006.01)
*H02M 7/483* (2007.01)
*H02S 40/32* (2014.01)
*H02J 3/38* (2006.01)

(52) U.S. Cl.
CPC ......... *H02M 3/33507* (2013.01); *H02J 3/381* (2013.01); *H02M 3/285* (2013.01); *H02M 7/483* (2013.01); *H02S 40/32* (2014.12); *H02J 2300/22* (2020.01); *H02J 2300/24* (2020.01); *H02J 2300/26* (2020.01); *H02J 2300/40* (2020.01); *H02M 7/4835* (2021.05); *Y02E 10/56* (2013.01)

(58) Field of Classification Search
CPC .. H02M 3/33507; H02M 3/285; H02M 7/483; H02S 40/32; H02J 3/381
USPC .................................. 307/52, 64, 66, 80, 82
See application file for complete search history.

(56) References Cited

U.S. PATENT DOCUMENTS

| | | | |
|---|---|---|---|
| 9,520,764 B1* | 12/2016 | Bundschuh | H02M 5/458 |
| 2015/0061569 A1* | 3/2015 | Alexander | H02J 7/0027 |
| | | | 320/101 |
| 2015/0256077 A1* | 9/2015 | Stratakos | H03K 17/693 |
| | | | 307/80 |
| 2017/0104426 A1* | 4/2017 | Mills | H02S 40/22 |
| 2019/0058242 A1* | 2/2019 | Tabe | H01Q 1/248 |

* cited by examiner

*Primary Examiner* — Rexford N Barnie
*Assistant Examiner* — Jagdeep S Dhillon

(57) ABSTRACT

Embodiments herein provide a system and method for controlling extraction of power from multiple Photo Voltaic (PV) arrays. At least two converters and at least two Photo Voltaic (PV) arrays are configured. The power extraction is controlled through one of an injection of Direct Current (Idc) into output current of each of the at least two converters, or by performing a phase shifting of each of the output current of each of the at least two converters.

12 Claims, 10 Drawing Sheets

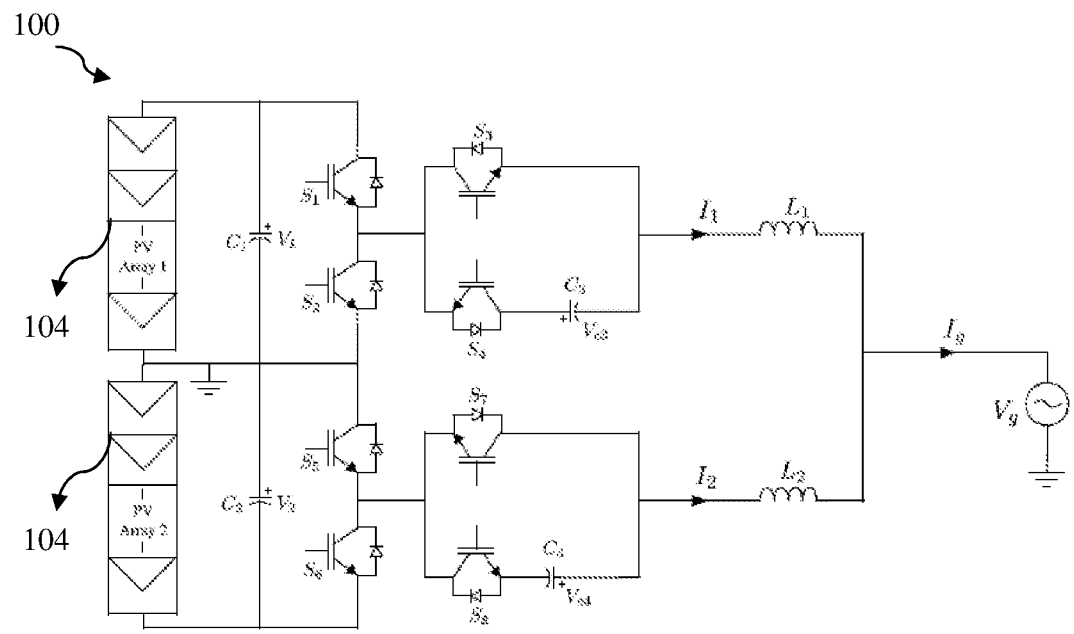
FIG. 2(a)
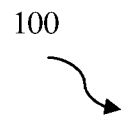

METHOD FOR CONTROLLING EXTRACTION OF POWER FROM MULTIPLE PHOTO VOLTAIC (PV) ARRAYS AND SYSTEM THEREOF

FIELD OF INVENTION

Present disclosure in general relates to Photo Voltaic (PV) arrays and more particularly to power extraction from the PV arrays. The present application is based on, and claims priority from Indian application No. 201821026838 filed on Jul. 18, 2018 the disclosure of which is hereby incorporated by reference.

BACKGROUND OF INVENTION

Photo Voltaic (PV) arrays are one of a widely used power generating units. PV arrays are so far being highly successful in meeting an increasing demand of energy. Through group of solar panels connected together, the PV array are able to utilize solar energy to a large extent. Performance of PV arrays are generally rated according to a maximum DC power output obtained through the PV arrays. Integration of the solar energy produced through the PV arrays to a grid, is generally enabled through transformerless converters. The transformerless converters are low in cost and are associated with a higher efficiency.

The transformerless converters are associated with a demerit of a galvanic connection that exists between the grid and the PV array. The galvanic connection may result in a high ground leakage current thereby making entire system unsecure and unsafe in terms of utility and operation.

Large number of solutions have been proposed for addressing the leakage current in the transformerless converters. Half Bridge (HB) based transformerless converters for example, neutral point clamped converters are preferred in case of large number of PV modules connected in series. The HB based transformerless converters may eliminate the ground leakage current while providing a multilevel voltage output. However, the proposed HB based converters need a larger DC link voltage (twice as high as compared to full bridge converter structures).

Furthermore, for HB based transformerless converters, the DC link comprises of a single PV array with large number of PV modules connected in series. Hence, power yield from the PV array may get reduced when the PV modules are subjected to varied environmental conditions such as shading. The HB based neutral point clamped converters are further associated with a limitation of power handling capability, as during operation, power is supplied only from one of a lower capacitor or an upper capacitor for one half cycle.

OBJECT OF INVENTION

The principal object of the embodiments herein is to provide a method for controlling power extraction from multiple Photo Voltaic (PV) arrays.

Another object of the embodiments herein is to provide a configuration of a first converter generating a first output current and a second converter generating a second output current and configuring at least two PV arrays.

Another object of the embodiments herein is to provide an injection of a Direct Current (DC) to each of the first output current and a second output current.

Another object of the embodiments herein is to perform a phase shifting of each of the first output current and the second output current.

SUMMARY

Accordingly, embodiments herein provide a method for controlling extraction of power from multiple Photo Voltaic (PV) arrays. The method comprises configuring, at least two converters for supplying current to a grid. First converter of the at least two converters generates a first output current and a second converter of the at least two converters generates a second output current. The method further comprises configuring, at least two Photo Voltaic (PV) arrays of the multiple PV arrays. The first converter is connected between a positive terminal of first PV array of the at least two PV arrays and the grid. A negative voltage is supplied through an internal capacitor of the first converter. The second converter is connected between a negative terminal of second PV array of the at least two PV arrays and the grid, and wherein a positive voltage is supplied through an internal capacitor of the second converter. The method further comprises controlling, the extraction of the power from the at least two PV arrays by using one or more predefined methodology.

Accordingly, another embodiment herein provides a system for controlling power extraction from multiple Photo Voltaic (PV) arrays. The system comprises at least two converters for supplying current to a grid. First converter of the at least two converters generate a first output current and a second converter of the at least two converters generate a second output current. The system further comprises at least two Photo Voltaic (PV) arrays of the multiple arrays. A negative terminal of first PV array of the at least two PV arrays and a positive terminal of a second PV array of the at least two PV arrays is connected to form a neutral point of each of first converter and second the converter. The first converter is connected between a positive terminal of first PV array of the at least two PV arrays and the grid and a negative voltage is supplied through an internal capacitor network of the first converter. The second converter is connected between a negative terminal of second PV array of the at least two PV arrays and the grid, and a positive voltage is supplied through an internal capacitor of the second converter. Direct Current (DC) is injected into each of the first output current and the second output current, such that no DC current is injected into the grid.

Accordingly, another embodiment herein provides a system for controlling power extraction from multiple Photo Voltaic (PV) arrays. The system comprises at least two converters for supplying current to a grid. First converter of the at least two converters generate a first output current and a second converter of the at least two converters generate a second output current. The system further comprises at least two Photo Voltaic (PV) arrays of the multiple arrays. A negative terminal of first PV array of the at least two PV arrays and a positive terminal of a second PV array of the at least two PV arrays is connected to form a neutral point of each of first converter and second the converter. The first converter is connected between a positive terminal of first PV array of the at least two PV arrays and the grid, and a negative voltage is supplied through an internal capacitor network of the first converter. The second converter is connected between a negative terminal of second PV array of the at least two PV arrays and the grid, and a positive voltage is supplied through an internal capacitor of the second converter. Each of the first output current and the second output current is modified by using one or more predefined methodology for controlling the power extraction.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This method and system is illustrated in the accompanying drawings, throughout which like reference letters indicate corresponding parts in the various figures. The embodiments herein will be better understood from the following description with reference to the drawings, in which:

FIG. 2(a) illustrates structure of one or more converters in the system, according to the embodiments as disclosed herein;

DETAILED DESCRIPTION OF INVENTION

Figure 1A:
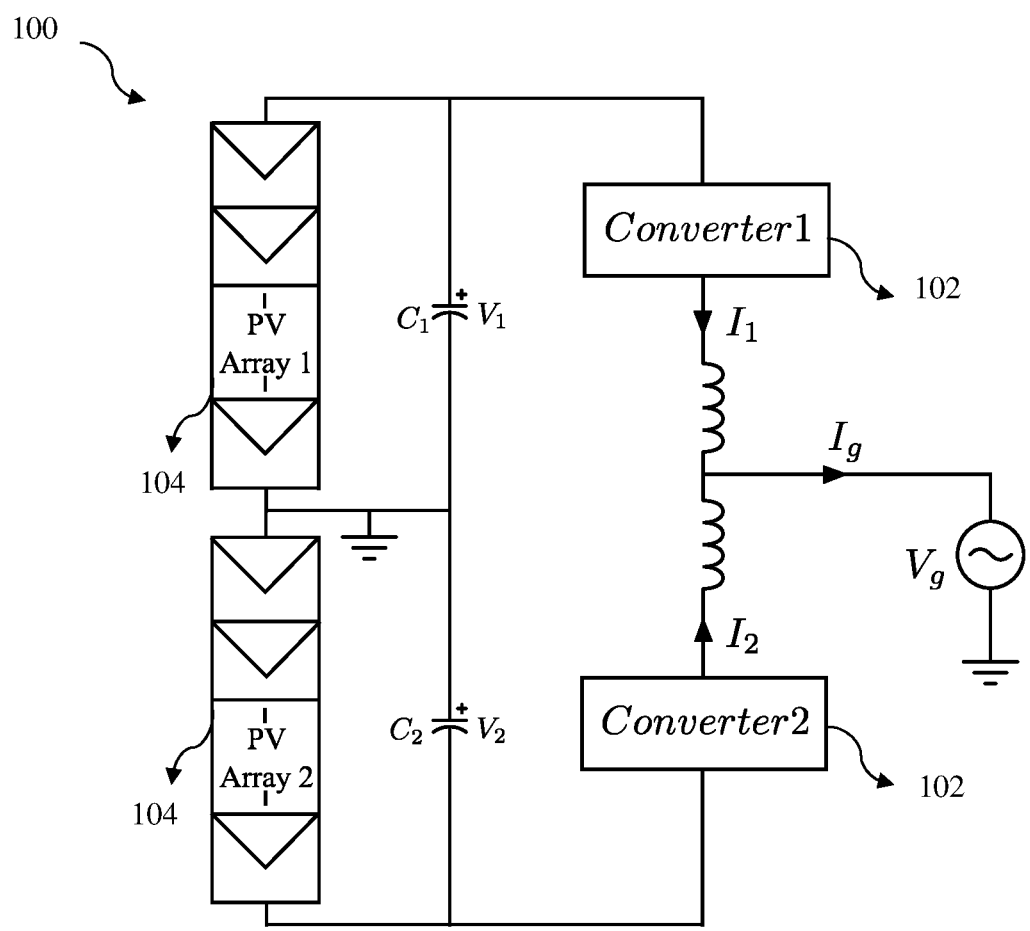
FIG. 1(a) illustrates a system for controlling extraction of power from multiple Photo Voltaic (PV) arrays, according to the embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Accordingly, embodiments herein provide a system and method for controlling extraction of power from multiple Photo Voltaic (PV) arrays. The system and the method may also be extended to multiphase converters.

In an exemplary configuration of the system, out of two converters, Converter1 may be connected between a positive terminal of PV array1 and grid. Positive polarity of output voltage is generated by connecting the PVarray1 to the grid. Zero output voltage is generated by connecting an output directly to a neutral point (a midpoint of PV array1 and PV array2). However, negative voltage polarity at the output is not directly available and may be supplied via an internal intermediate capacitor of the converter1.

In an exemplary scenario, the system may be provided with a multilevel transformer-less converter capable of eliminating the common mode leakage current by connecting the PV array's negative terminal to grid neutral point. Therefore, to generate output voltage of negative polarity, one of an intermediate capacitor or an internal capacitor is used. Each of the charging and discharging of one of the internal capacitor or the intermediate capacitor depends on a direction of the grid current. For unity power factor (UPF) operation, the capacitor charges in a positive half cycle during the zero-output state and the capacitor discharges in a negative half cycle during negative output state. However, an amplitude of current is lower during zero output state as compared to the negative output state, also each of a charging duration and a discharging duration is not same.

Therefore, charging and discharging of the capacitor is asymmetric and depends on the converter modulation index and power factor. As a result of such asymmetric operation, the capacitor charge balance over a cycle may not be maintained for the modulation index higher than 0.637 at UPF. To extend the converter operation for full range of modulation index, the converter should have more number of zero output states while the converter output current is positive. The more number of zero output states is possible only when the converter output current may have some dc shift for allowing more number of charging states.

Therefore, to balance the voltage across the capacitor, the converter modulation index is restricted to 0.637 for UPF operation. However, for a dual converter arrangement (as proposed in the present disclosure and discussed later), the output of converted may have dc shift as long as no dc current is injected into the grid. Thus, to have no dc injection into the grid, a sum of dc current injected by each of the converter1 and the converter2 should be zero. In other words, the dc current injected by converted and converter2 should be equal in magnitude but opposite in polarity. Based on this concept, a new control technique is disclosed in this invention which involves injection of dc current into the individual converter output currents.

Referring now to the drawings, and more particularly to FIG. 1, FIG. 1(b), FIG. 1(c) and FIG. 3, there are shown preferred embodiment.

According to an embodiment, referring to FIG. 1(a), a system 100 for controlling an extraction of power from multiple Photo Voltaic (PV) arrays is shown. The system 100 operates in plurality of modes for controlling the extraction of the power. The plurality of modes comprises a dc injection mode (mode 1), a phase shifting mode (mode 2) and a normal operating mode (mode 0) wherein the system 100 acts as a single converter supplying power to grid.

The system 100 comprises at least two converters 102 for supplying current to a grid. A first converter 102 of the at least two converters 102 generates a first output current $I_1$ and a second converter 102 of the at least two converters generates a second output current $I_2$. Current entering into the grid is $I_g$. The current $I_g$ is a sum of the first output current $I_1$ and the second output current $I_2$.

The system 100 further comprises at least two Photo Voltaic (PV) arrays 104 of the multiple PV arrays. The at least two PV arrays 104 comprises a first PV array 104 and a second PV array 104. The first converter 102 is connected between a positive terminal of the first PV array 104 of the at least two PV arrays 104 and a grid. A negative voltage is supplied through an internal capacitor of the first converter 102.

The second converter 102 is connected between a negative terminal of the second PV array 104 of the at least two PV arrays 102 and the grid.

A positive voltage is supplied through an internal capacitor of the second converter 102. A neutral point of the grid is clamped to a midpoint of the at least two PV arrays 102 i.e. the midpoint of the first PV array 104 and the second PV array 104. The clamping ensures that there is no common mode leakage current. The clamping enables the system 100 to provide a transformer-less operation.

The positive polarity of output voltage is generated by connecting the first PV array 104 to the grid. Zero output voltage is generated by connecting the output directly to the neutral point, i.e. the midpoint of the first PV array 104 and the second PV array 104.

The DC current of the first output current $I_1$ is equal in magnitude to the DC current of the second output current $I_2$. The DC current of the first output current $I_1$ is opposite in polarity to the DC current of the second output current $I_2$.

The system 100 is configured for controlling the extraction of the power through one or more predefined methodology. The one or more predefined methodology comprises one of a dc injection method (mode 1) and a phase shift method (mode 2). Each of the dc injection method and the phase shift method will now be explained in detail.

Figure 1B:
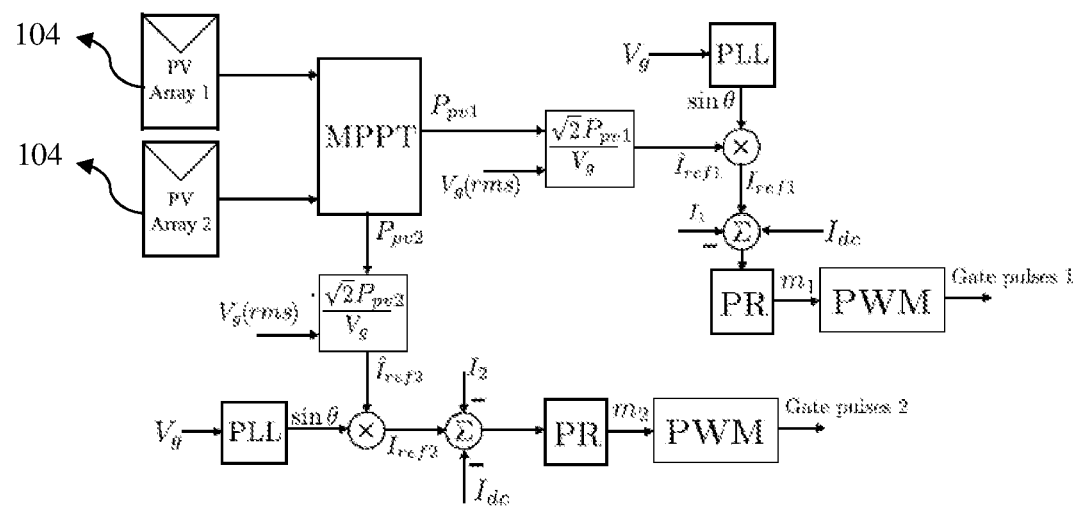
FIG. 1(b) illustrates the system with an injection of Direct Current ($I_{dc}$) in output current of one or more converters, according to the embodiments as disclosed herein.

Referring to FIG. 1(b), the system 100 for controlling the extraction of the power from the multiple PV arrays 104 through injection of DC $I_{dc}$ is shown. Control through injection of the $I_{dc}$ may is referred as mode 1 hereafter, only for a purpose of illustration for which intent is not to limit the scope of the invention. In FIG. 1(b), for a purpose of illustration, and without limiting the scope invention, two PV arrays 104 are shown.

$I_{dc}$ is injected to each of the first output current $I_1$ and the second output current $I_2$. $I_{dc}$ is injected in a way to avoid an injection of the $I_{dc}$ current into the grid. Therefore, to have no $I_{dc}$ injection into the grid, the sum of the $I_{dc}$ current injected by the first converter 102 and the second converter 102 should be zero.

Figure 1C:
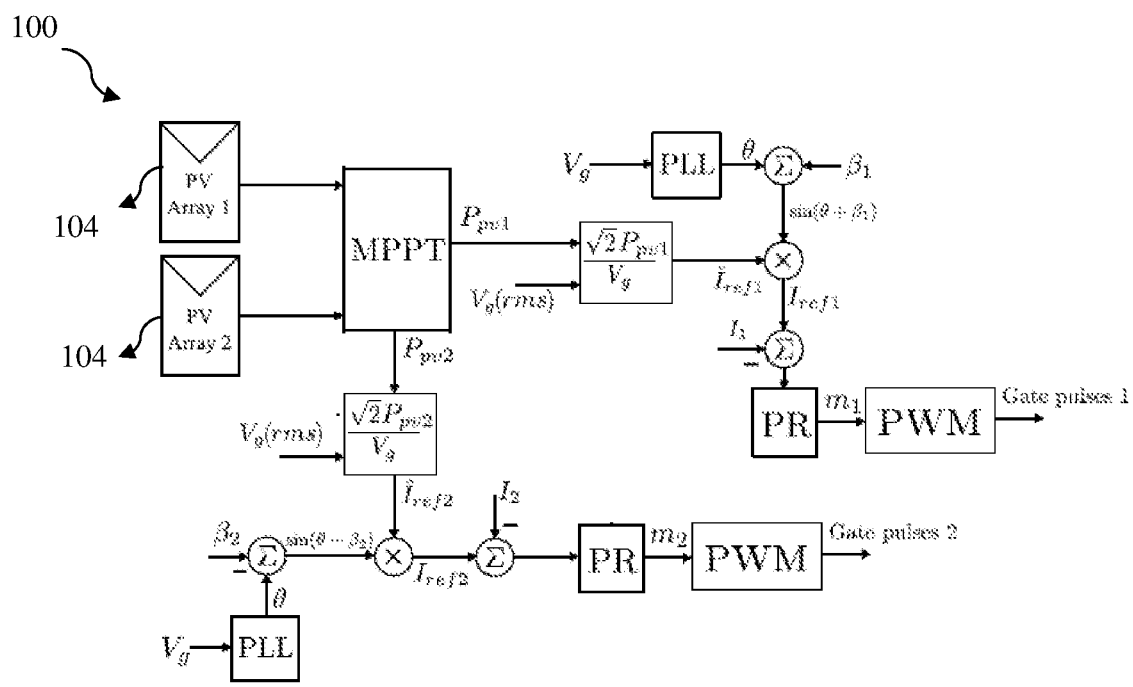
FIG. 1(c) illustrates system with phase shifting in the output currents of the one or more converters, according to the embodiments as disclosed herein.

Referring to FIG. 1(c), the system 100 for controlling the extraction of the power from multiple PV arrays 104 based on the introduction of phase shift is shown. Control through the phase shift introduction may be referred as the mode 2 hereafter, only for a purpose of illustration for which intent is not to limit the scope of the invention.

A maximum modulation index ($m_1$ or $m_2$) for each of the first converter 102 and the second converter 102 is a function of the power factor. Therefore, if each of the first converter 102 and the second converter 102 are operated at a non UPF while injecting power into the grid at UPF, the maximum power may be extracted by phase shifting each of the reference current for the first converter 102 and the second converter 102.

The internal capacitor of the first converter 102 may also be charged in a negative half cycle of the grid voltage when the grid current is positive. The charging of the capacitor in the negative half cycle enables the operation of each of the first converter 102 and operation of the second converter 102 for a full range of modulation index ($m_1$ and $m_2$). Therefore, if output currents $I_1$ of the first converter 102 and the output current $I_2$ of the second converter 102 are phase shifted such that the sum of the first output current $I_1$ and the second output current I is in phase with the grid voltage $V_g$, then dual converter arrangement (first converter 102 and second converter 102) may inject power into the grid at the UPF for a full range of modulation index ($m_1$ and $m_2$).

The phase shifting is performed for each of the first output current $I_1$ by a first phase shift angle $\beta_1$ and the second output current $I_2$ by a second phase shift angle $\beta_2$. A sum of the first output current $I_1$ and the second output current $I_2$ is injected into the grid.

While performing the phase shift, the maximum power point $P_{pv1}$ for the first PV array 104 and the maximum power point $P_{pv2}$ for the second PV array 102 is obtained by using the predefined algorithm. The first reference current $I_{ref1}$ for the first output current $I_1$ and the second reference current $I_{ref2}$ for the second output current $I_2$ is then obtained based on the maximum power point $P_{pv1}$ and $P_{pv2}$ for each of the first PV array 104 and the second PV array 104.

The first output current $I_2$ is then phase shifted with the first phase shift angle β1 and the second output current $I_2$ is phase shifted by the second phase shift angle β2 with respect to the grid voltage $V_g$.

While calculating each of the first phase shifting angle β1 and the second phase shifting angle β2, the internal capacitors (the internal capacitors) for each of the first converter 102 and the second converter 102 are maintained at the predefined normal values.

In a case, a magnitude of a maximum power obtained from each of the first PV array 104 and the second PV array 102 is of same value, then each of the first phase shift angle β1 and the second phase shift angle β2 are equal.

One or more control techniques may be used to control each of the first output current $I_1$ and the second output current $I_2$ The one or more control technique comprises a proportional resonant current control technique. The one or more control techniques further comprises a current control technique. Converter modulation index $m_1$ for the first converter 102 and the converter modulation index $m_2$ for the second converter 102 are obtained from closed loop current control. The gate pulses for each of the first converter 102 and the second converter 102 are now obtained by applying a pulse width modulation technique.

Each of the first output current $I_1$ and the second output current $I_2$ are controlled by using a current control technique. The current control technique comprises one or more standard methods. The standard methods comprises one of a proportional resonant control technique, a PI control technique, a PR+HC control technique, or a hysteresis current control technique.

Referring to FIG. 2(a), a structure of each of the first converter 102 and the second converter 102 is shown. For a purpose of explanation, the first converter 102 and the second converter 102 are considered as a converter 102 due to similarities in circuit architecture. In an example embodiment, multiple legs of the converter 102 may be connected together to a form multiphase converter.

In an embodiment, the switches may be realized using one of a series combination of devices or a parallel combination of devices having bidirectional current carrying capabilities. The devices may be realized using an one of an Insulated-Gate Bipolar Transistor (IGBT), a Metal-Oxide-Semiconductor Field-Effect Transistor (MOSFET), thyristors, diodes, or using other devices of these class.

The converter 102 consists of plurality of switches and a network of capacitors. In an example, the plurality of switches comprises at least 8 switches $S_1$, $S_2$, $S_3$, $S_4$, $S_5$, $S_6$, $S_7$ and $S_8$. The converter 102 further comprises at least two DC link capacitors $C_1$ and $C_2$ and at least two internal capacitors $C_3$ and $C_4$.

The converter 102 is configured to extract a maximum power from each of the first PV array 104 and the second PV array 104 under each of a normal operating condition and a varied environmental condition. The varied environmental condition comprises shading.

The normal mode described herein, may be considered as Mode 0. During the normal operation the first converter 102 and the second converter 102 may obtain an equal amount of the maximum power from each of the first PV array 104 and the second PV array 104. Further, in normal operation, the maximum power point voltages for the first converter 102 and the second converter 102 and current for each of the first converter 102 and the second converter 102 are also equal.

The first converter 102 and the second converter 102 act as a single converter 102. The single converter 102 generates a 3-level output voltage. The 3-level output voltage so obtained comprises each of a $V_{dc}$, 0, $-V_{dc}$.

The $V_{dc}$ output voltage is obtained by operating each of the first switch $S_1$, the third switch $S_3$, the fifth switch $S_5$ and the eight $S_8$. The $-V_{dc}$ output voltage is obtained by operating each of the second switch $S_2$, the fourth switch $S_4$, the sixth switch $S_6$ and the seventh switch $S_7$.

The 0-output voltage level is obtained by operating at least one switch from one of a first group switches, a second group of switches, a third group of switches, or a fourth group of switches. The first group of switches comprises the second switch $S_2$, the third switch $S_3$, the fifth switch $S_5$, and the seventh switch $S_7$, the second group of switches comprises the first switch $S_1$, the fourth switch $S_4$, the fifth switch $S_5$ and the seventh switch $S_7$. The third group of switches comprises the second switch $S_2$, the third switch $S_3$, the sixth switch $S_6$, and the eight switch $S_8$. The fourth group of switches comprises the first switch $S_1$, the fourth switch $S_4$, the sixth switch $S_6$ and the eight switch $S_8$ The 3-level output voltage may be obtained by following a switching pattern as shown on Table 1. As shown in table 1, the switching pattern comprises plurality of redundancy states maintaining voltage across each of the capacitor $C_3$ and the capacitor $C_4$ at $V_{dc}$.

TABLE 1

| $V_0$ | $S_1$ | $S_2$ | $S_3$ | $S_4$ | $S_5$ | $S_6$ | $S_7$ | $S_8$ |
|---|---|---|---|---|---|---|---|---|
| $V_{dc}$ | 1 | 0 | 1 | 0 | 1 | 0 | 0 | 1 |
| 0 | 0 | 1 | 1 | 0 | 1 | 0 | 1 | 0 |
| 0 | 0 | 1 | 0 | 0 | 1 | 1 | 0 | 1 |
| 0 | 0 | 0 | 1 | 1 | 0 | 0 | 1 | 0 |
| 0 | 1 | 0 | 0 | 1 | 0 | 1 | 0 | 1 |
| $-V_{dc}$ | 0 | 1 | 0 | 1 | 0 | 1 | 1 | 0 |

Figure 2B:
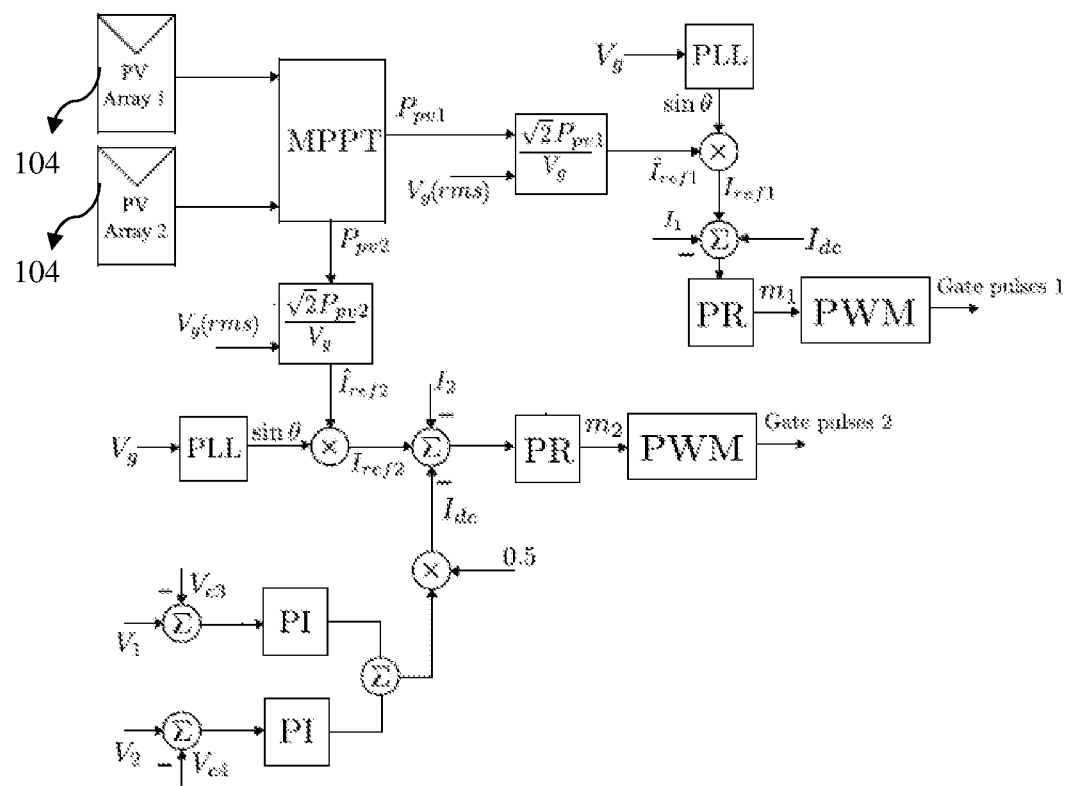
FIG. 2(b) illustrates details regarding the injection of the $I_{dc}$ as shown in FIG. 2(a), according to the embodiments as disclosed herein.

Referring to FIG. 2(b), injection of the $I_{dc}$ current maintains the internal capacitor voltages due to which each of the first converter 102 and the second converter 102 operates over a whole range of modulation index (a ratio of the output voltage peak to the input dc link voltage) of each of the first converter 102 and the second converter 102. The $I_{dc}$ to be injected is obtained by averaging out the output of at least two PI controllers 202 configured for maintaining the internal capacitor voltage equal to a dc link voltage. The PI controllers are controllers having a control loop where an error signal is multiplied by a proportional and an integral constant.

While injecting the $I_{dc}$, a maximum power point $P_{pv1}$ for the first PV array 104 and a maximum power point $P_{pv2}$ for the second PV array 104 $P_{pv2}$ is obtained by using a predefined algorithm. The predefined algorithm comprises an MPPT algorithm. The MPPT algorithm comprises one of an incremental conductance algorithm or a hill climbing algorithm.

For calculating the $I_{dc}$ to be injected, a first reference current $I_{ref1}$ for the first output current $I_1$ and a second reference current $I_{ref2}$ for the second output current $I_2$ is calculated based on the maximum power point $P_{pv1}$ and $P_{pv2}$ for each of the first array 104 and the second array 104 respectively. The $I_{dc}$ current is then added to the first reference current $I_{ref1}$ and the $I_{dc}$ current is subtracted from the second reference current $I_{ref2}$. No dc current $I_{dc}$ is injected into the grid current $I_g$.

While calculating the DC current, an internal capacitor voltage for each of the first converter 102 and the second converter 102 are balanced.

Converter modulation index $m_1$ for the first converter 102 and a converter modulation index $m_2$ for the second converter 102 are obtained from a closed loop current control. Gate pulses for each of the first converter 102 and the second converter 102 converter are now obtained by applying a pulse width modulation technique.

Figure 2C:
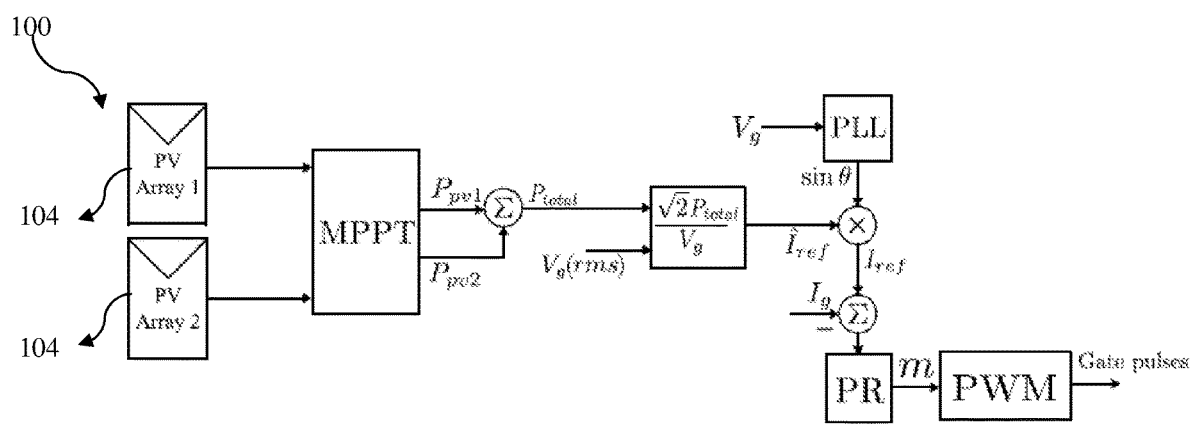
FIG. 2(c) illustrates voltage details during a normal operation of the system of FIG. 1, according to the embodiments as disclosed herein.

Referring to FIG. 2(c), in mode 0, each of the voltages $V_1$, $V_2$, $V_{c3}$ and $V_{c4}$ are maintained equal at $V_{dc}$ via the control technique as described in above for mode 1 and mode 2. The converter 102 is operated in a current control mode and the grid current Ig is controlled in proportion to a maximum total power ($P_{total}$) available. The maximum total power ($P_{total}$) is a sum of each of the maximum power point $P_{pv1}$ for the first converter and the maximum power point $P_{pv2}$ for the second converter 102. As discussed earlier, the maximum power points ($P_{pv1}$ and $P_{pv2}$) may be calculated with the MPPT algorithm comprising the incremental conductance method.

In case of the varied environmental conditions, the maximum power that may be obtained from each the first PV array 104 and the second PV array 104 may differ in value. Each of the first converter 102 and the second converter 102 independently tracks the maximum power by operating as two independent decoupled converters as shown in FIG. 1(a).

Each of the capacitor $C_1$ and the capacitor $C_3$ and each of the switches $S_1$-$S_4$ of the plurality of switches act as one independent converter unit (the first converter 102) and the switches $S_5$-$S_8$ of the plurality of switches along with each of the capacitor $C_2$ and the capacitor $C_4$ acts as second independent converter unit (the second converter 102). Each of the first converter 102 and the second converter 102 may generate the 3-level output voltage. The 3-level output voltages so obtained $V_{dc}$, 0, $-V_{dc}$. The switching pattern to obtain these voltages is shown in Table 2 for the first converter 102 and in Table 3 for the second converter 102.

TABLE 2

| $V_0$ | $S_1$ | $S_2$ | $S_3$ | $S_4$ |
|---|---|---|---|---|
| $V_{dc}$ | 1 | 0 | 1 | 0 |
| 0 | 1 | 0 | 0 | 1 |
| 0 | 0 | 1 | 1 | 0 |
| $-V_{dc}$ | 0 | 1 | 0 | 1 |

TABLE 3

| $V_0$ | $S_5$ | $S_6$ | $S_7$ | $S_8$ |
|---|---|---|---|---|
| $V_{dc}$ | 1 | 0 | 0 | 1 |
| 0 | 1 | 0 | 1 | 0 |
| 0 | 0 | 1 | 0 | 1 |
| $-V_{dc}$ | 0 | 1 | 1 | 0 |

The total current injected into the grid (Ig) is the sum of the output currents $I_1$ and $I_2$. Each of the first converter 102 and the second converter 102 are operated in current control mode and currents $I_1$ and $I_2$ are controlled in proportion to the maximum power of each of the first PV array 104 ($P_{pv1}$) and the second PV array 104 ($P_{pv2}$) respectively.

Figure 3:
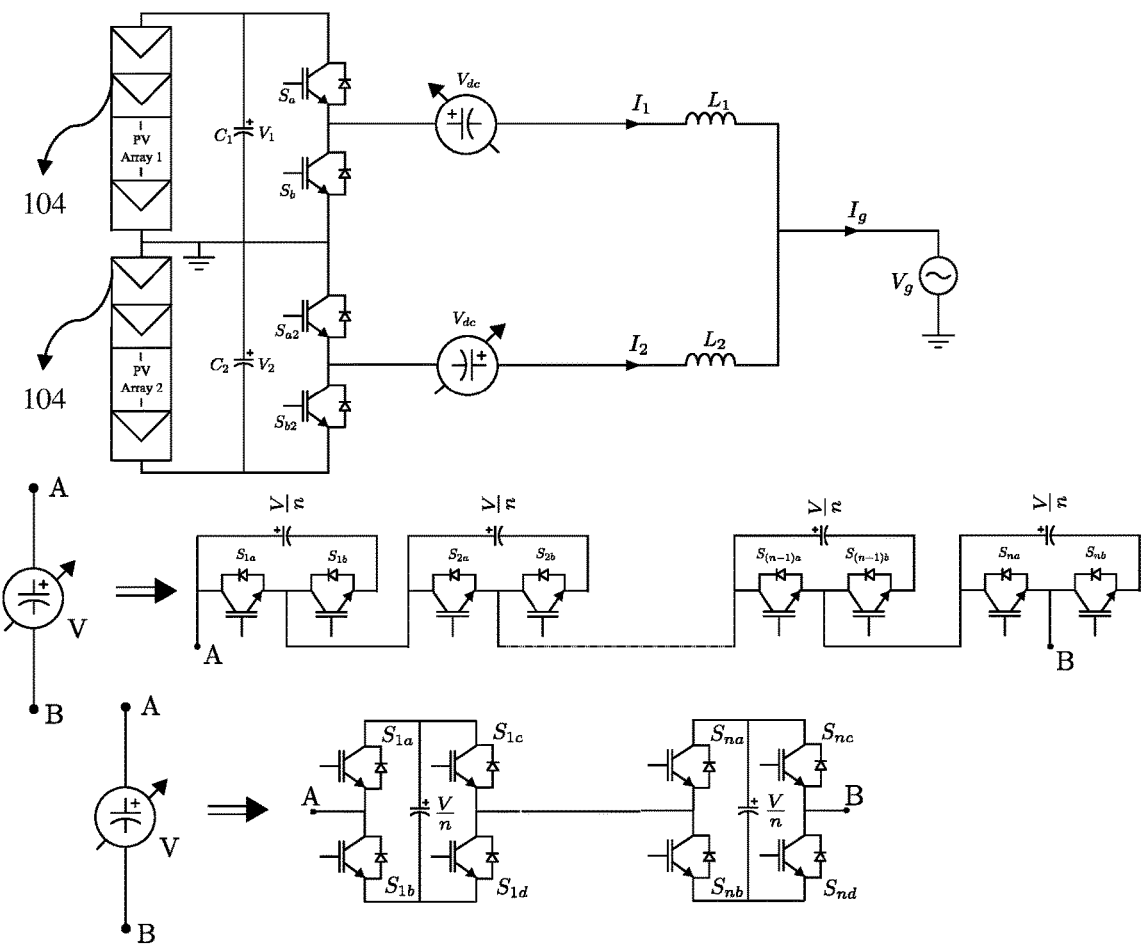
FIG. 3 illustrates the structure of each of the first converter 102 and the second converter as shown in above FIG. 2(a) extended for multilevel operation by adding one or more half bridge submodules in the system of FIG. 2(a), according to the embodiments as disclosed herein.

Referring to FIG. 3, the structure of each of the first converter 102 and the second converter as shown in above FIG. 2(*a*) may be extended for multilevel operation by adding one or more half bridge submodules in the system 100. The system 100 as shown in FIG. 3 will operate similarly in each of the mode 0, mode 1 and mode 2 as described above.

Figure 4A:
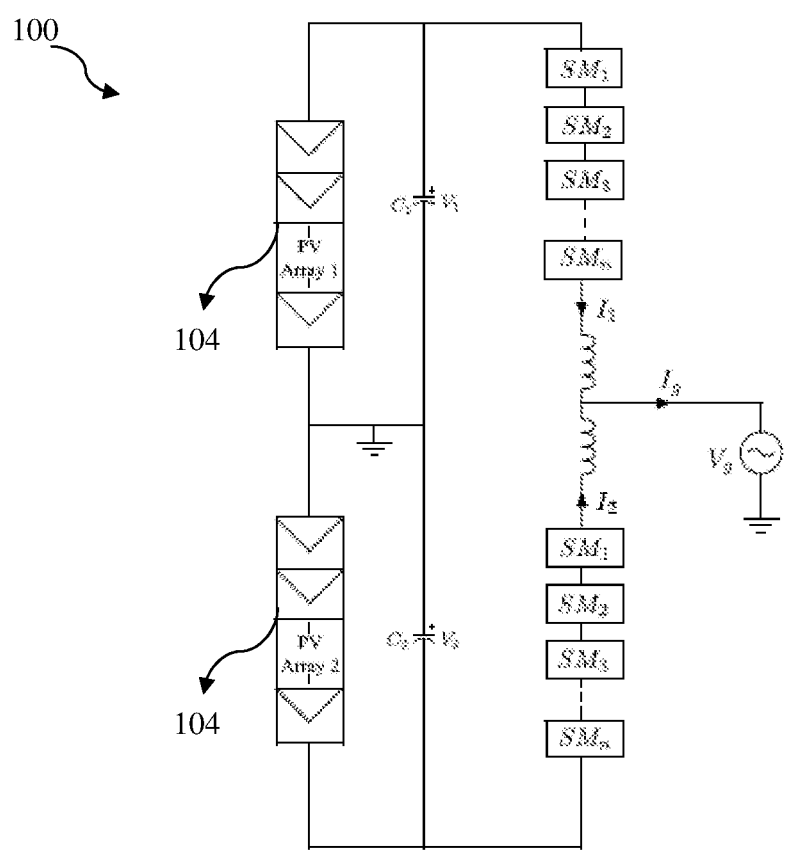
FIG. 4(a) illustrates a control strategy through the injection of $I_{dc}$ applied to a Modular Multilevel Converter (MMC), according to the embodiments as disclosed herein.

As shown in FIG. 4(*a*), the control strategy through the injection of $I_{dc}$ (model) may also be applied to a modular multilevel converter. In the Modular Multilevel Converter (MMC), the $I_{dc}$ is injected in each of individual arm currents (a lower arm and an upper arm).

The MMC considered here consists of two arms per phase. Each arm of the two arms consists of one or more submodules connected in series. An output current of the MMC is sum of individual arm currents containing a fundamental grid frequency component and a circulating current component. The circulating current has a dc component enabling power flow from the dc side to the ac side while maintaining the submodule capacitor voltage.

The output power of MMC is proportional to circulating dc current and conventional control of the MMC ensures the flow of this circulating dc current. Another way to achieve the same is by injecting dc current in the individual arm currents. Therefore, the control strategy in the model (dc injection mode as discussed above) may also be applied to the MMC which involves injection of dc current in the individual arm currents. The injected dc current ensures that the submodule voltages remain balanced while transferring power from the dc side to the ac side. If no dc current is injected into the individual arm currents, the submodule capacitors will continue to discharge and the converter will cease to operate.

Thus, the upper arm submodules and the lower arm submodules are controlled as two independent converters as shown in FIG. 4(*a*). The converters are operated in current control mode and the references for currents $I_1$ and $I_2$ are obtained from MPPT algorithm. To keep the submodule voltages balanced, a dc current is added to reference current $I_{ref1}$ and subtracted from current $I_{ref2}$. As the same dc current is added and subtracted from the converter reference currents, the dc current injected into the grid is zero.

The dc current to be injected is obtained by averaging out the output of PI controllers for maintaining the upper arm and lower arm module voltages. The control technique is described below in FIG. 4(*b*). As the arm currents are directly controlled to be sinusoids with a dc shift, there is no need for 2nd harmonic elimination techniques. When the converter as shown in FIG. 4(*a*) is operated with conventional control, simultaneous maximum power extraction from both the PV arrays is not possible. The control technique as described in FIG. 4(*b*) can ensure simultaneous maximum power extraction from both the PV arrays. However, this can result slight deviation in the upper arm and lower arm module voltages. For 3-phase MMC operation same control technique as described in FIG. 4(*b*) can be applied on per phase basis wherein, per phase arm currents are controlled with suitable current control method.

Referring to FIG. 1(*b*), FIG. 2(*b*) and FIG. 4(*a*), the system 100 further comprises multiple half bridge circuits. A first half bridge circuit of the multiple half bridge circuits is connected between a positive terminal of the first PV array 104 and the neutral point of each of the first converter 102 and the second converter 102 thereby forming an upper half bridge. A second half bridge circuit is connected between a negative terminal of the second PV array 104 and the neutral point of each of the first converter 102 and the second converter 102 thereby forming a lower half bridge.

A positive terminal of the upper half bridge circuit is connected to the positive terminal of the first PV array 102 and the negative terminal of the upper half bridge is connected to the neutral point. Further, an output of the upper half bridge is connected to an internal capacitor network. The internal capacitor network comprises a series connected half bridge submodules and full bridge submodules forming the upper arm of the first converter.

A negative terminal of the lower half bridge circuit is connected to the negative terminal of the second PV array 104 and a positive terminal of the lower half bridge is connected to the neutral point. An output of the lower half bridge is connected to the internal capacitor network. The internal capacitor network comprises the series connected half bridge submodules and full bridge submodules forming a lower arm of the second converter. The upper arm is connected to the grid through a grid interfacing inductor and the lower arm is connected to the grid through the grid interfacing inductor.

A grid neutral is connected to the neutral point of each of the first converter 102 and the second converter 102. The first converter 102 comprises each of the upper half bridge and the upper arm submodules. The second converter 102 comprises each of the lower half bridge and the lower arm submodules.

Referring to FIG. 2 (*a*), the upper half bridge comprises each of a first switch ($S_1$) and a second switch ($S_2$). The upper arm submodule comprises each of the half bridge with each of a third switch ($S_3$) and a fourth switch ($S_4$) and a module capacitor $C_3$.

The lower half bridge comprises of each of a fifth switch ($S_5$) and a sixth switch ($S_6$). The lower arm submodule comprises each of the half bridge with each of a seventh switch ($S_7$) and eight switch ($S_8$) with a module capacitor ($C_4$). A DC link capacitor $C_1$ is connected across the first PV array 104 and a DC link capacitor $C_2$ is connected across the second PV array 104.

While injecting the $I_{dc}$, submodule voltages are maintained at a balance while transferring power from dc side to ac side. If no dc current is injected into the individual arm currents, one or more submodule capacitors will continue to discharge and each of the first converter 102 and the second converter 102 may cease to operate. Therefore, upper arm submodules and the lower arm submodules are controlled as two independent converters (the first converter 102 and the second converter 102) as shown in FIG. 2(c).

Figure 4B:
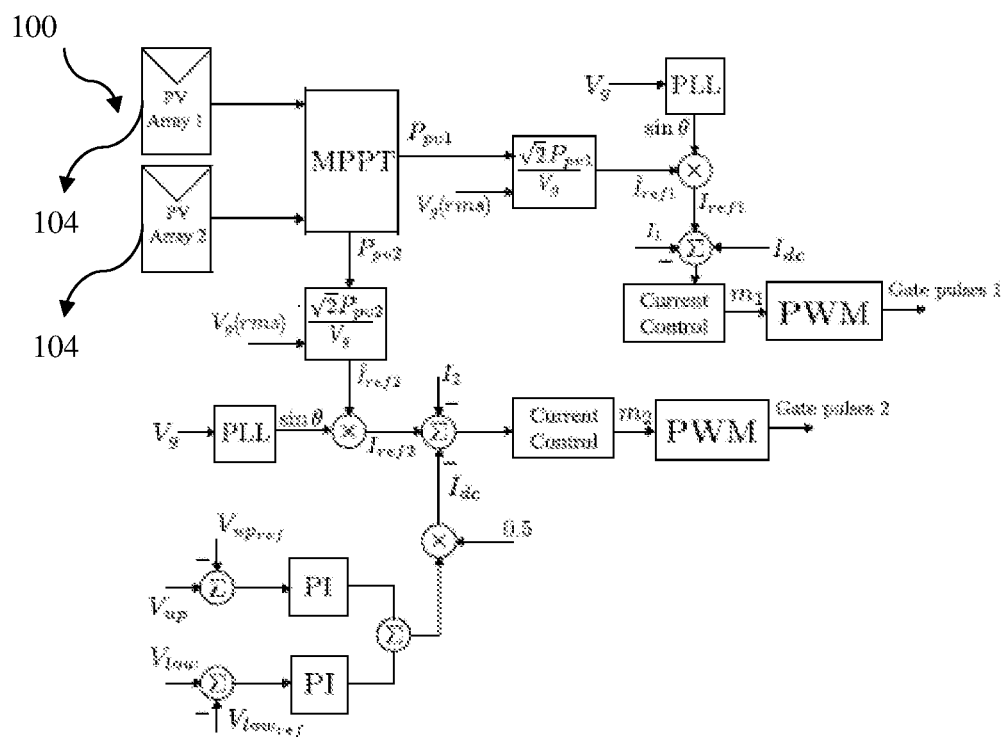
FIG. 4(b) illustrates details of lower arm current and upper arm current in the Modular Multilevel Converter (MMC) of FIG. 4(a), according to the embodiments as disclosed herein.

Referring to FIG. 4(b), each of the lower arm current and the upper arm current are directly controlled to be sinusoids with a dc shift.

The dc current to be injected ($I_{dc}$) may also be determined analytically as $I_{dc}=I_{p^*}$ Sin (k). Where k is governed by the equation 2 Cos(k)+Sin(k)*($\pi$−2 k)−M$\pi$=0. Where, m ($m_1$ or $m_2$) is the converter modulation index for each of the first converter 102 and the second converter and $I_p$ is a peak arm current of each of the first converter 102 and the second converter.

Figure 5:
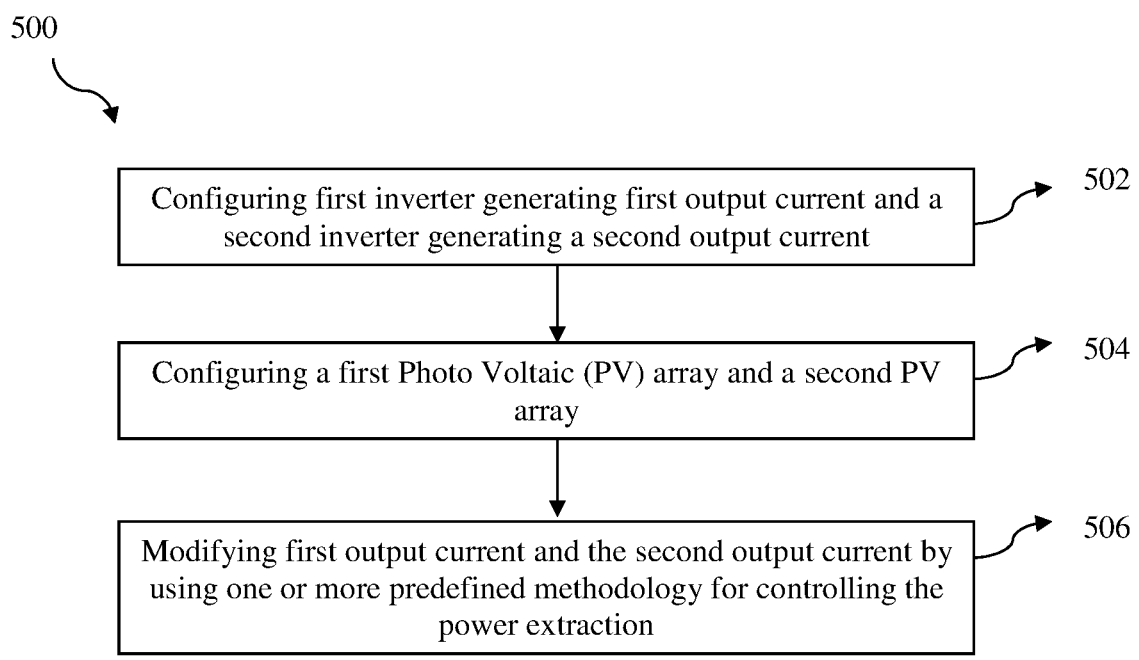
FIG. 5 illustrates a flow chart of a method for controlling extraction of power from multiple Photo Voltaic (PV) arrays based on an injection of a DC current, according to the embodiments as disclosed herein.

Referring to FIG. 5, a method 500 for controlling extraction of power from multiple Photo Voltaic (PV) arrays is shown. The method is executed through the system 100. At step 502, at least two converters are configured for supplying current to the grid. The first converter of the at least two converters generate the first output current and the second converter of the at least two converters generates the second output current.

At step 504, at least two Photo Voltaic (PV) arrays of the multiple PV arrays are configured. The first converter is connected between a positive terminal of first PV array of the at least two PV arrays and the grid. The negative voltage is supplied through the internal capacitor of the first converter. The second converter is connected between the negative terminal of the second PV array of the at least two PV arrays and the grid. The positive voltage is supplied through the internal capacitor of the second converter.

At step 506, the extraction of the power from the at least two PV arrays by using one or more predefined methodology. The one or more predefined methodology comprises one of the one of a dc injection method (mode 1) and a phase shift method (mode 2). Each of the dc injection method and the phase shift method are explained above from FIG. 1(a) to FIG. 4(b) and hence are not repeated for the sake of brevity.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A system for controlling power extraction from multiple Photo Voltaic (PV) arrays, the system comprising: at least two converters for supplying current to a grid, wherein first converter of the at least two converters generate a first output current and a second converter of the at least two converters generate a second output current; at least two Photo Voltaic (PV) arrays of the multiple arrays, wherein a negative terminal of first PV array of the at least two PV arrays and a positive terminal of a second PV array of the at least two PV arrays is connected to form a neutral point of each of first converter and second the converter; wherein the first converter is connected between a positive terminal of first PV array of the at least two PV arrays and the grid, and wherein a negative voltage is supplied through an internal capacitor network of the first converter; wherein the second converter is connected between a negative terminal of second PV array of the at least two PV arrays and the grid, and wherein a positive voltage is supplied through an internal capacitor of the second converter; wherein each of the first output current and the second output current is modified by using one or more predefined methodology for controlling the power extraction by one of: injecting, Direct Current (DC) to each of the first output current and the second output current, such that no DC current is injected into grid, and performing, a phase shifting of each of the first output current by a first phase shift angle and the second output current by a second phase shift angle, such that a sum of the first output current and the second output current is injected into the grid.

2. The system as claimed in claim 1, wherein the one or more predefined methodology comprises injecting the DC current into each of the first output current and the second output current such that no DC current is injected into the grid comprises: obtaining a maximum power point for each of the first array and the second array by using a predefined algorithm; calculating a first reference current for the first output current and a second reference current for the second output current, based on the maximum power point for each of the first array and the second array; calculating the DC current; adding the DC current to the first reference current; and subtracting the DC current from the second reference current, wherein the DC current of the first output current is equal in magnitude to the DC current of the second output current, and wherein the DC current of the first output current is opposite in polarity to the DC current of the second output current, and wherein the dc current is injected such that an internal capacitor for each of the first converter and the second converter is balanced at a predefined normal value.

3. The system as claimed in claim 1, wherein the one or more predefined methodology comprises phase shifting the first output current by a first phase angle and phase shifting the second output current by a second phase angle with respect to the grid voltage, such that a sum of the first output current and the second output current is injected into the grid comprises: obtaining a maximum power point for each of the first array and the second array by using a predefined algorithm, wherein the pre-defined is one of an incremental conductance algorithm or a hill climbing algorithm; calculating a first reference current for the first output current and a second reference current for the second output current, based on the maximum power point for each of the first array and the second array; and phase shifting each of the first output current with the first phase shift angle and the second output current by the second phase shift angle with respect to the grid voltage, wherein each of the first phase shifting angle and the second phase shifting angle are calculated such that the internal capacitors for each of the first converter and the second converter are maintained at a predefined normal value.

4. The system as claimed in claim 1, wherein each of the first converter and the second converter comprises: a plurality of switches, wherein each switch of the plurality of switches in connected in one of a series combination of one or more devices, or a parallel combination of one or more devices, wherein the one or more devices comprises one of an Insulated-Gate Bipolar Transistor (IGBT), a Metal-Oxide-Semiconductor Field-Effect Transistor (MOSFET), thyristors, diodes; and a network of capacitors, wherein a first capacitor (CI) of the network of capacitors is connected across the first PV array and a second capacitor (C2) of the network of capacitors is connected across the second PV array, wherein a voltage across each of the first capacitor and the second capacitor is Vdc.

5. The system as claimed in claim 1, comprises: multiple half bridge circuits and full bridge circuits, wherein a first half bridge circuit of the multiple half bridge circuits is connected between a positive terminal of the first PV array and the neutral point of each of the first converter and the second converter thereby forming an upper half bridge; and a second half bridge circuit connected between a negative terminal of second PV array and the neutral point of each of the first converter and the second converter thereby forming a lower half bridge, wherein a positive terminal of the upper half bridge circuit is connected to the positive terminal of the first PV array and the negative terminal of the upper half bridge is connected to the neutral point, and wherein an output of the upper half bridge is connected to an internal capacitor network, wherein the internal capacitor network comprises a series connected half bridge and full bridges forming the upper arm of the converter, and wherein a negative terminal of the lower half bridge circuit is connected to the negative terminal of the second PV array, and a positive terminal of the lower half bridge is connected to the neutral point, and wherein an output of the lower half bridge is connected to an internal capacitor network, wherein the internal capacitor network comprises a series connected half bridge and full bridge submodules forming a lower arm of the converter; and wherein the upper half bridge comprises each of a first switch (Si) and a second switch (S2), and wherein the upper arm comprises each of the half bridge with each of a third switch (S3) and a fourth switch (S4) and a module capacitor C3, wherein the lower half bridge comprises of each of a fifth switch (Ss) and a sixth switch (S6), and wherein the lower arm submodule comprises each of the half bridge with each of a seventh switch (S7) and eight switch (Ss) with a module capacitor (C4).

6. The system as claimed in claim 1, wherein the first converter comprises an upper arm of a modular multilevel converter, and wherein the second converter comprises a lower arm of the modular multilevel converter, wherein the upper arm is connected to the grid through an inductor and the lower arm is connected to the grid through an inductor, and wherein a grid neutral is connected to the neutral point of each of the first converter and the second converter, wherein the upper arm comprises of series connection of half bridges and at least one full bridge, wherein the lower arm comprises of series connection of half bridges and at least one full bridge.

7. The system as claimed in claim 5, wherein the first converter comprises each of an upper half bridge and the upper arm of the converter, and wherein the second converter comprises each of the lower half bridge and the lower arm of the converter.

8. The system as claimed in claim 7, wherein a positive polarity of voltage is generated at an output of each of the first converter and the second converter by connecting the positive terminal of first PV array to each of the grid and through the internal capacitors of the lower arm, and wherein a negative polarity of voltage is generated at output of each of the first converter and the second converter by connecting the negative terminal of the second PV array to the grid and through the internal capacitors of the upper arm.

9. The system as claimed in claim 4, wherein each of the first converter and the second converter act as a single converter, and wherein the single converter produces an output voltage, wherein the output voltage comprises each of a Vdc, 0, and −Vdc wherein the Vdc output voltage is obtained by operating each of the first switch Si, the third switch S3, the fifth switch Ss and the eight Ss, wherein −Vdc output voltage is obtained by operating each of the second switch S2, the fourth switch S4, the sixth switch S6 and the seventh switch S7 and wherein the 0 output voltage level is obtained by operating at least one switch from one of a first group switches, a second group of switches, a third group of switches, or a fourth group of switches, wherein the first group of switches comprises the second switch S2, the third switch S3, the fifth switch Ss, and the seventh switch S7, the second group of switches comprises the first switch Si, the fourth switch S4, the fifth switch Ss and the seventh switch S7, the third group of switches comprises the second switch S2, the third switch S3, the sixth switch S6, and the eight switch S8, and the fourth group of switches comprises the first switch Si, the fourth switch S4, the sixth switch S6 and the eight switch Ss.

10. The system as claimed in claim 5, wherein the first converter comprises of the upper half bridge and the upper arm submodules, and wherein the output of the first converter comprises each of a of Vdc voltage, 0 voltage, and −Vdc voltage, wherein the output voltage Vdc is obtained by operating each of the switch Si and the switch S3, wherein the output voltage −Vdc is obtained by operating each of the switch S2 and the switch S4, and wherein the 0-output voltage is obtained by operating one of the switch from the first switch Si and the fourth switch S4, or from the second switch S2 and the third switch S3.

11. The system as claimed in claim 5, wherein the second converter comprises of the lower half bridge and the lower arm submodules, and wherein the output of the first converter comprises each of a of Vdc voltage, 0 voltage, and −Vdc voltage, wherein the output of the second converter comprises each of a Vdc voltage, 0 voltage, and −Vdc voltage, wherein output voltage Vdc is obtained by operating each of the fifth switch SS and the eighth switch Ss, wherein the output voltage −Vdc is obtained by operating each of the sixth switch S6 and the seventh switch S7 and wherein the output voltage 0 is obtained by operating each of the fifth switch Ss and the seventh switch S7, and wherein the output voltage 0 is obtained by operating each of the sixth switch S6 and eighth switch Ss.

12. The system as claimed in 8, wherein multiple legs of the converter are connected thereby forming a multiphase converter.

* * * * *